(12) United States Patent
Xiao et al.

(10) Patent No.: US 9,593,975 B2
(45) Date of Patent: Mar. 14, 2017

(54) METHOD FOR DETERMINING THE LIQUID LEVEL IN A BOILER

(75) Inventors: Taikang Xiao, Singapore (SG); Tamilselvan Thirumazhisai Sankaralingam, Singapore (SG); Jose Luis Estrada, Singapore (SG); Hock Soon Tiew, Singapore (SG); Chaithra Belle, Singapore (SG); Jasmeet Singh Chadha, Singapore (SG); Barry Eng Keong Tay, Singapore (SG)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 965 days.

(21) Appl. No.: 12/532,463

(22) PCT Filed: Mar. 21, 2008

(86) PCT No.: PCT/IB2008/051079
§ 371 (c)(1),
(2), (4) Date: Sep. 22, 2009

(87) PCT Pub. No.: WO2008/120130
PCT Pub. Date: Oct. 9, 2008

(65) Prior Publication Data
US 2010/0107886 A1 May 6, 2010

(30) Foreign Application Priority Data
Mar. 30, 2007 (EP) .................... 07105285

(51) Int. Cl.
*A47J 31/44* (2006.01)
*G01F 23/00* (2006.01)
(Continued)

(52) U.S. Cl.
CPC ............ *G01F 23/246* (2013.01); *D06F 75/12* (2013.01); *F22B 1/285* (2013.01); *F22B 37/78* (2013.01); *G01F 23/22* (2013.01)

(58) Field of Classification Search
CPC .......... A47J 31/44; D06F 75/12; F22B 37/78; G01F 23/22; G01F 23/246
(Continued)

(56) References Cited

U.S. PATENT DOCUMENTS 2,791,906 A * 5/1957 Vetter ............................. 73/291
2,997,989 A * 8/1961 Jones ......................... 122/451.1
(Continued)

FOREIGN PATENT DOCUMENTS

EP 0772000 A1 5/1997
EP 0843039 A1 5/1998
(Continued)

*Primary Examiner* — Quang D Thanh
*Assistant Examiner* — Kuangyue Chen (57) ABSTRACT

A method for determining a liquid level in a boiler of an apparatus having a temperature sensor for sensing a temperature which is indicative of a temperature of the liquid inside the boiler, includes inducing a temporary deflection of the temperature sensed by the temperature sensor; determining an evaluation temperature sensed by the temperature sensor after inducing the deflection; and determining the liquid level from at least the evaluation temperature. The evaluation temperature is determined by monitoring the deflection and by defining an extreme value of the deflection as the evaluation temperature.

12 Claims, 6 Drawing Sheets

(51) Int. Cl.
   *A47J 27/00* (2006.01)
   *G01F 23/24* (2006.01)
   *D06F 75/12* (2006.01)
   *F22B 1/28* (2006.01)
   *F22B 37/78* (2006.01)
   *G01F 23/22* (2006.01)

(58) Field of Classification Search
   USPC .................. 392/322–341, 401; 73/295;
   340/618–623, 626; 426/231–233;
   99/325–339; 219/483, 485, 494, 497,
   219/501; 307/39–41
   See application file for complete search history.

(56) References Cited

U.S. PATENT DOCUMENTS

| | | | | |
|---|---|---|---|---|
| 3,048,036 | A * | 8/1962 | Van Ham | 73/290 R |
| 3,065,634 | A * | 11/1962 | Kinderman | 73/302 |
| 4,116,045 | A * | 9/1978 | Potter | 73/61.46 |
| 4,590,797 | A * | 5/1986 | Beaubatie et al. | 73/295 |
| 4,720,997 | A * | 1/1988 | Doak et al. | 73/295 |
| 4,765,945 | A * | 8/1988 | Walleser | 376/258 |
| 5,136,305 | A | 8/1992 | Ims | |
| 5,245,869 | A * | 9/1993 | Clarke et al. | 73/149 |
| 5,367,146 | A * | 11/1994 | Grunig | 219/497 |
| 5,437,002 | A * | 7/1995 | Bennett | 392/441 |
| 5,533,074 | A * | 7/1996 | Mansell | 376/258 |
| 5,719,332 | A * | 2/1998 | Wallrafen | 73/295 |
| 5,812,060 | A * | 9/1998 | DeSpain et al. | 340/618 |
| 5,881,207 | A | 3/1999 | DeBourg et al. | |
| 6,028,521 | A * | 2/2000 | Issachar | 340/624 |
| 6,067,403 | A | 5/2000 | Morgandi | |
| 6,202,486 | B1 * | 3/2001 | Kemp | 73/295 |
| 6,223,595 | B1 * | 5/2001 | Dumbovic et al. | 73/295 |
| 6,294,765 | B1 * | 9/2001 | Brenn | 219/494 |
| 6,334,360 | B1 * | 1/2002 | Chen | 73/304 R |
| 6,615,658 | B2 * | 9/2003 | Snelling | 73/295 |
| 6,666,086 | B2 * | 12/2003 | Colman et al. | 73/304 C |
| 6,705,162 | B2 * | 3/2004 | Amoretti | 73/304 C |
| 7,021,087 | B2 * | 4/2006 | France et al. | 68/17 R |
| 7,826,723 | B2 * | 11/2010 | Rho et al. | 392/311 |
| 2002/0125242 | A1 * | 9/2002 | Nomura et al. | 219/497 |
| 2002/0145527 | A1 * | 10/2002 | Lassota | 340/622 |
| 2003/0227387 | A1 * | 12/2003 | Kimberlain et al. | 340/618 |
| 2005/0024217 | A1 * | 2/2005 | Sabatino | 340/618 |
| 2005/0126489 | A1 * | 6/2005 | Beaman et al. | 118/724 |
| 2005/0262939 | A1 * | 12/2005 | Scardovi | 73/304 C |
| 2006/0007008 | A1 * | 1/2006 | Kates | 340/605 |
| 2006/0042376 | A1 * | 3/2006 | Reusche et al. | 73/304 C |
| 2006/0098964 | A1 * | 5/2006 | Haubold et al. | 392/447 |
| 2007/0079653 | A1 * | 4/2007 | Zuleta et al. | 73/304 R |
| 2007/0169280 | A1 * | 7/2007 | Kim et al. | 8/149.3 |

FOREIGN PATENT DOCUMENTS

| | | | | |
|---|---|---|---|---|
| EP | | 0843039 B1 * | 11/2001 | |
| EP | | 1300503 A1 * | 4/2003 | D06F 75/12 |
| EP | | 1808524 A1 | 7/2007 | |
| JP | | S6435220 A | 2/1989 | |
| JP | | H01161117 A | 6/1989 | |
| JP | | H04292952 A | 10/1992 | |
| JP | | 2004121663 A | 4/2004 | |
| JP | | 2005138389 A | 6/2005 | |
| JP | | 2005337627 A | 12/2005 | |
| WO | WO | 2005038356 A1 * | 4/2005 | |
| WO | WO | 2006067756 A2 * | 6/2006 | |

* cited by examiner

METHOD FOR DETERMINING THE LIQUID LEVEL IN A BOILER

FIELD OF THE INVENTION

The present invention generally relates to a method of determining a liquid level in a boiler of an apparatus having a temperature sensor for sensing a temperature which is indicative of a temperature of the liquid inside the boiler, comprising the steps of: inducing a temporary deflection of the temperature sensed by the temperature sensor; determining an evaluation temperature sensed by the temperature sensor after inducing the deflection; and determining the liquid level from at least the evaluation temperature.

BACKGROUND OF THE INVENTION

Steam generating apparatuses are used for heating water in order to generate steam which can be used for example for ironing cloth. In these apparatuses the steam is generated within a boiler in which the temperature of the water can be controlled within a certain temperature range by means of a heating device and a temperature sensor as follows: When the temperature signal of the temperature sensor indicates, that the temperature of the water falls below a certain level, the heating device is activated and the water is heated. If the temperature signal indicates, that the water temperature rises above a certain level, the heating device is deactivated.

Generally, in such steam generating apparatuses, the boiler is refilled with water from a larger water tank automatically. As a prerequisite for realizing a smooth refilling operation, the water level inside the boiler has to be detected, such that water is refilled into the boiler when the water level drops below a certain water level. A water level sensor which would be arranged inside the boiler would very soon provide inaccurate results due to calcification of the inside of the boiler or the usage of de-mineralized water which can cause inaccurate sensing.

EP 0 843 039 B1 describes a steam generator which comprises an evaporation boiler associated with heater elements and fed with water by a pump, a solenoid valve for expelling steam, and regulator means including a temperature sensor or a pressure sensor for monitoring the quantity of water introduced into the boiler and for controlling the pump, wherein the regulator means are associated with an electronic system for taking successive measurements for actuating the pump as a function of the value of the slope of a curve representing variation in temperature or pressure, said slope being analyzed by the electronic system.

However, actuating the pump according to the value of the slope of the curve representing variation in temperature requires a very accurate and expensive temperature sensor since this slope method requires a very direct heat transfer through a thin wall such that slightest variations of the slope of the curve are detected. Also the mounting of such a temperature sensor costs much effort because the required sensing accuracy requires a very good heat conductivity between the temperature sensor and the water inside the boiler. The required sensing accuracy requires arranging the temperature sensor at a flat portion for a proper mounting of the sensor, which in turn complicates the forming of the shell. A heat conductive paste may be applied between the temperature sensor and the boiler shell. However, this makes additional mounting processes necessary. Arranging the temperature sensor somewhere else is not possible since the sensing accuracy would not be sufficient for determining the water level with the method described in EP 0 843 039 B1.

It is therefore an object of the invention to provide an alternative method of determining the liquid level in a boiler of a steam generating apparatus providing a comparable accuracy in determining the liquid level and providing more flexibility in arranging a required temperature sensor.

SUMMARY OF THE INVENTION

This object is solved by the features of the independent claims. Further developments and preferred embodiments of the invention are outlined in the dependent claims. In accordance with the invention, there is provided a method of determining a liquid level in a boiler of an apparatus having a temperature sensor for sensing a temperature which is indicative of a temperature of the liquid inside the boiler, comprising the steps of: inducing a temporary deflection of the temperature sensed by the temperature sensor; determining an evaluation temperature sensed by the temperature sensor after inducing the deflection; and determining the liquid level from at least the evaluation temperature, wherein the evaluation temperature is determined by monitoring the deflection and by defining an extreme value of the deflection as the evaluation temperature. This method provides the advantage that the liquid level inside the boiler can be sensed very accurate without the need of using a highly accurate and expensive temperature sensor. This method even offers the possibility to arrange the temperature sensor not directly to the wall of the boiler, but to arrange it at any place at which the temperature it senses is indicative of the temperature of the liquid. The main advantage of the invention is that with the method of the present invention, the design constraints compared to the slope method can be overcome. By determining the liquid level using an extreme value, the determination is not that delicate anymore since, compared to the slope method, there exists no time aspect (the slope is the first derivative of the temperature-time curve). Further, it is possible to use an already available temperature sensor which is in contact with a heating plate of the heating device. In the context as used herein, temporary deflection means that the temperature course (or curve) rises after a certain action in form of a positive curve (overshot) and then falls again leaving a maximum value. Also, temporary deflection means that the temperature course (or curve) falls after a certain action in form of a negative curve (undershot) and then rises again leaving a minimum value. The above mentioned determination of the evaluation temperature consists of two steps which are: monitoring the deflection and defining an extreme value of the deflection as the evaluation temperature. Monitoring the deflection means that the temperature course is observed by sensing the temperature continuously. The extreme value can be determined by comparing two consecutive temperature values such that it can be determined if the extreme value of the deflection is reached. The present invention is suitable to analyze the following phenomena. When during the operation of the steam generating apparatus liquid is refilled such that the refilled liquid lands on the liquid already inside the boiler and such that it is directed to a spot in the vicinity of where the temperature sensor senses the temperature, the refilled cold liquid causes a temperature drop down to a minimum temperature value. Then the already present hot liquid will mix up with the refilled cold liquid and raise the temperature sensed by the temperature sensor again. This downward peak of the temperature course is referred to as temperature undershot, the magnitude of which is dependent on the liquid level inside the boiler. When the steam generating system is powered on, the temperature rises due to operating a heating device. Even after powering off the heating device, the temperature will still rise up to a maximum value, because of the heat accumulated in the heating device. Then the temperature sensed by the temperature sensor will decrease again after reaching a certain maximum value which depends on the liquid level inside the boiler—the higher the liquid level the more the accumulated heat is drawn off the heating device after it is turned off. This upward peak of the temperature course is referred to a temperature overshot. The method of the present invention is suitable for analyzing the liquid level in both situations accurately by sensing a temperature undershot or a temperature overshot by searching for extreme values of the temperature.

According to a specific embodiment it is preferred that the temporary deflection of the temperature is induced by turning on a heating device for heating the liquid. This embodiment refers to the above described case in which the steam generating system is powered on such that the temperature rises due to operating a heating device. In this embodiment the temporary deflection is a temperature overshot.

Advantageously, the liquid level is determined as low, if the evaluation temperature is greater than or equal to a first low level threshold. Having an additional reference value, for example the temperature at the start of the heating or the temperature at which the heating device is turned off, only the evaluation temperature is necessary to determine the liquid level inside the boiler.

In accordance with an embodiment of the invention, the heating device stays turned on until the temperature is greater than or equal to a first threshold temperature. In this embodiment, this is the relevant time for starting the monitoring for determining an extreme temperature. After passing the threshold temperature and turning off the heating device, the temperature still rises up to a peak or a maximum value before it lowers again such that the temperature course describes the overshot.

In a specific embodiment, the liquid level is determined as low, if the difference between the evaluation temperature and the first threshold temperature is greater than or equal to a second low level threshold. The second low level threshold is a predetermined temperature difference. This embodiment is intended to sense the liquid level during the start-up of the steam generating apparatus.

According to another embodiment, the temporary deflection of the temperature is induced by filling liquid into the boiler. This embodiment refers to the above described case in which liquid is filled into the boiler on the basis of a regularly repeating procedure for maintaining the liquid level within the boiler after extracting steam from the boiler. In this embodiment the temporary deflection is a temperature undershot.

In this regard, it is advantageous that the liquid level is determined based on a difference between a comparison temperature and the evaluation temperature, wherein the comparison temperature is sensed when filling liquid into the boiler is started. Thus, when the comparison temperature is sensed at the beginning or right before the filling operation starts, a reference value for the determination of the liquid level can be obtained which clearly shows the temperature drop caused by filling in a predetermined amount of liquid. Due to the predetermined amount, the method is able to compare an expected temperature drop with an actual temperature drop in order to determine the liquid level inside the boiler.

According to a preferred embodiment of the present invention, the comparison temperature is sensed after an accumulated time of extracting steam from the boiler is greater than or equal to a steaming threshold. After extracting steam for a certain time period, a fixed volume of liquid has to be refilled into the boiler anyway in order to maintain a sufficient liquid level inside the boiler. The invention enables to combine this automatically repeated refilling operation with the method for detecting the liquid level according to the present invention.

If the refill is not sufficient, the steaming threshold is varied depending on the liquid level as determined before. Thus, if despite of the refill the liquid level is determined as being low, the interval until the next fixed volume of liquid is refilled is shortened by setting the steaming threshold to a predetermined value. For the case that a high liquid level is determined, the refill interval is enlarged by increasing the steaming threshold.

In another advantageous embodiment, it is concluded that a liquid tank from which a pump supplies the boiler with liquid is empty, if the liquid level within the boiler does not rise despite of operating the pump. This way the present invention can be also used for detecting and indicating that the liquid tank from which the boiler is supplied is empty. Therefore, the method of the present invention is suitable for an overall liquid management and only requires a single temperature sensor.

In accordance with the invention, there is also provided a steam generating apparatus and a domestic appliance which provide the same advantages as described above.

These and other aspects of the invention will be apparent from and elucidated with reference to the embodiments described hereinafter.

DESCRIPTION OF PREFERRED EMBODIMENTS

Figure 1:
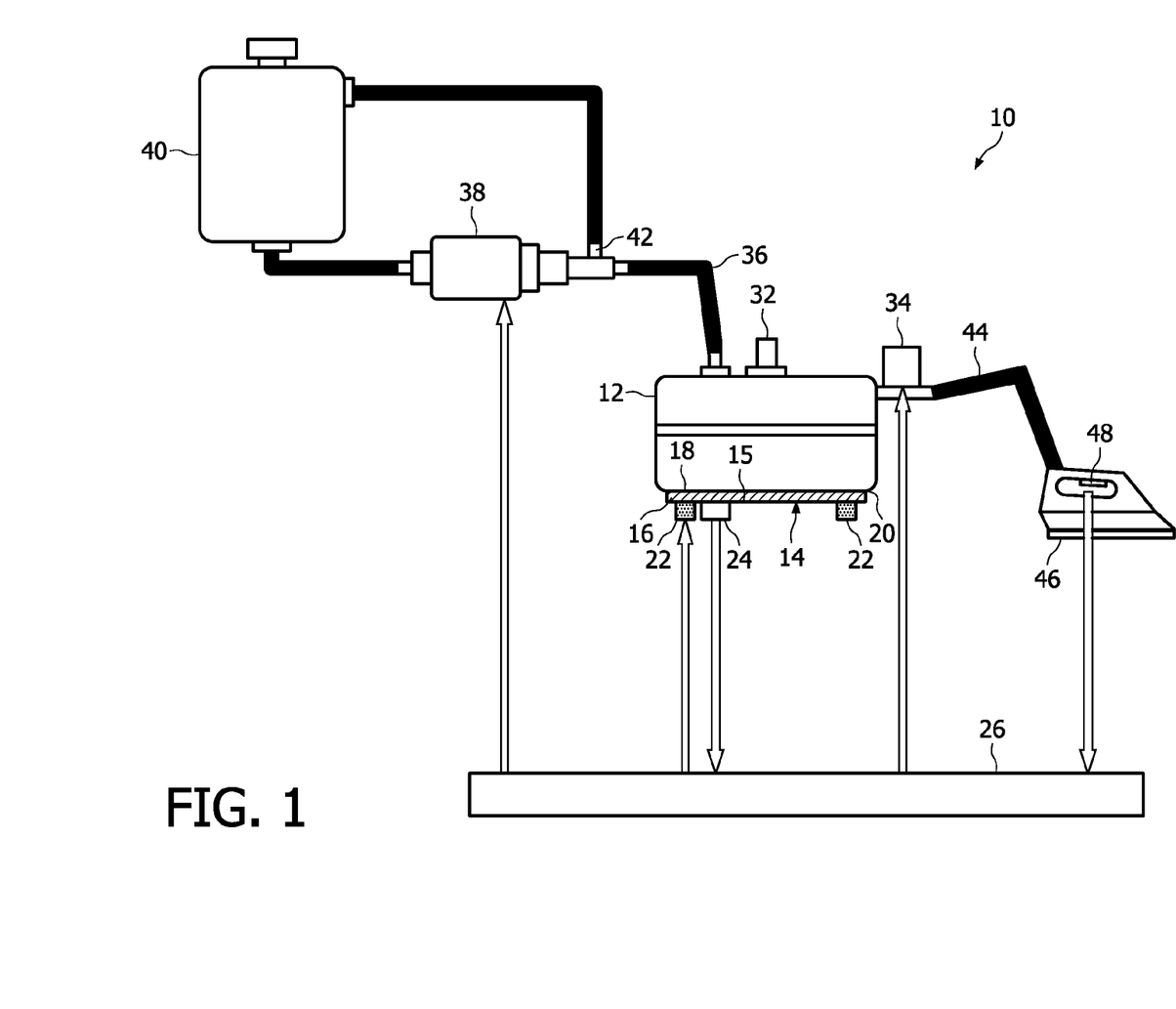
FIG. 1 shows a schematic set up of a steam generating device according to the present invention.

FIG. 1 shows a schematic set up of a steam generating device 10 according to the present invention. The steam generating device 10 comprises a water boiler 12 being manufactured by connecting at least two formed metal shells of stainless steel. The boiler 12 has a flat bottom portion 16 and is mounted in a plastic enclosure in a horizontal arrangement. Other orientations like a non horizontal arrangement are also possible. The flat bottom portion 16 of the boiler 12 is attached to a heating device 14 comprising a heating plate 15 and a heating element 22 which is attached to the heating plate 15 by forming an intermetallic layer or by casting to improve the heat transfer. The heating plate is made of aluminum—an aluminum alloy or other materials with excellent heat conductivity can also be used. The heating plate 15 comprises a flat upper portion 18 and is attached with its flat upper portion 18 to the flat bottom portion 16 of the body 12 by formation of an intermetallic layer 20. The intermetallic layer 20 may be formed by welding, brazing, soldering, and the like. The heating element 22 is attached to the heating plate 15 also by forming an intermetallic layer by welding, brazing, soldering, a similar joining method or by casting-in, to ensure good heat transfer ability. Further, the heating device 14 comprises a temperature sensor 24 for sensing a temperature T which is indicative of a water temperature inside the boiler 12. The boiler 12 of the steam generating device 10 is further equipped with a safety valve 32, an electrical steam output valve 34 and a water inlet 36. The water inlet 36 of the boiler 12 is connected with an electrical water pump 38 connected with a water tank 40 which holds preferably water but which can also store other liquids like water with certain additives. Between the water pump 38 and the water inlet 36, a de-airing valve 42 is provided, enabling a connection of the boiler 12 with the water tank 40 being open to the atmosphere. Furthermore, the boiler 12 is connected via an electrical steam output valve 34 and a steam delivery hose 44 with a steam iron 46. The steam iron comprises a steam trigger 48. An electronic control unit 26 is connected with the water pump 38, the heating element 22, the temperature sensor 24, the electrical steam output valve 34, and with the steam trigger 48 of the steam iron 46. This electronic control unit 26 controls the user interface with steam rate selection buttons and LED lights for system status indication.

The steam generating device 10 is suitable for use in a domestic appliance comprising, besides the steam ironing device shown as a preferred embodiment, a steamer, a steam cleaner, an active ironing board, a facial sauna, a steam cooking device, a coffee making machine and the like. The temperature sensor 24 is used to detect changes in the water level of the boiler 12. When the water level is lower than a certain level or the boiler 12 is empty, the electronic control unit 26 activates the pump 38 for a certain time period to pump water into the boiler 12 for raising the water level. The de-airing valve 42 provides a connection of the boiler 12 with the atmosphere to prevent the boiler 12 from being overfilled with water, if during cooling down after use, a vacuum is formed inside the boiler 12. The temperature sensor 24 may be mounted on the heating plate 15 (as shown), in this way, the temperature sensor 24 is located adjacent to an area being in good thermal contact with the water inside the boiler 12 in order to properly sense the water temperature. Preferably, the temperature sensor 24 is located at a position underneath the water inlet 36 (as shown) such that the incoming water is guided to the sensing area of the temperature sensor 24. Alternatively, the temperature sensor 24 may be mounted on the side walls of the boiler 12, wherein water supplied via the water inlet 36 should be guided to flow down the inner surface of the wall to the sensing area of the temperature sensor 24. If the sensed temperature is lower than a preset temperature value, the pressure is also lower than the required level. In this case, the electronic control unit 26 activates the heating element 12. If the temperature sensor 24 signals a water temperature reaching or exceeding the preset temperature value, the heating element 22 is turned off by the electronic control unit 26. This is a simple way of controlling the steam pressure inside the boiler 12. After activating the steam trigger 48, the air will be released together with the steam.

Figure 2:
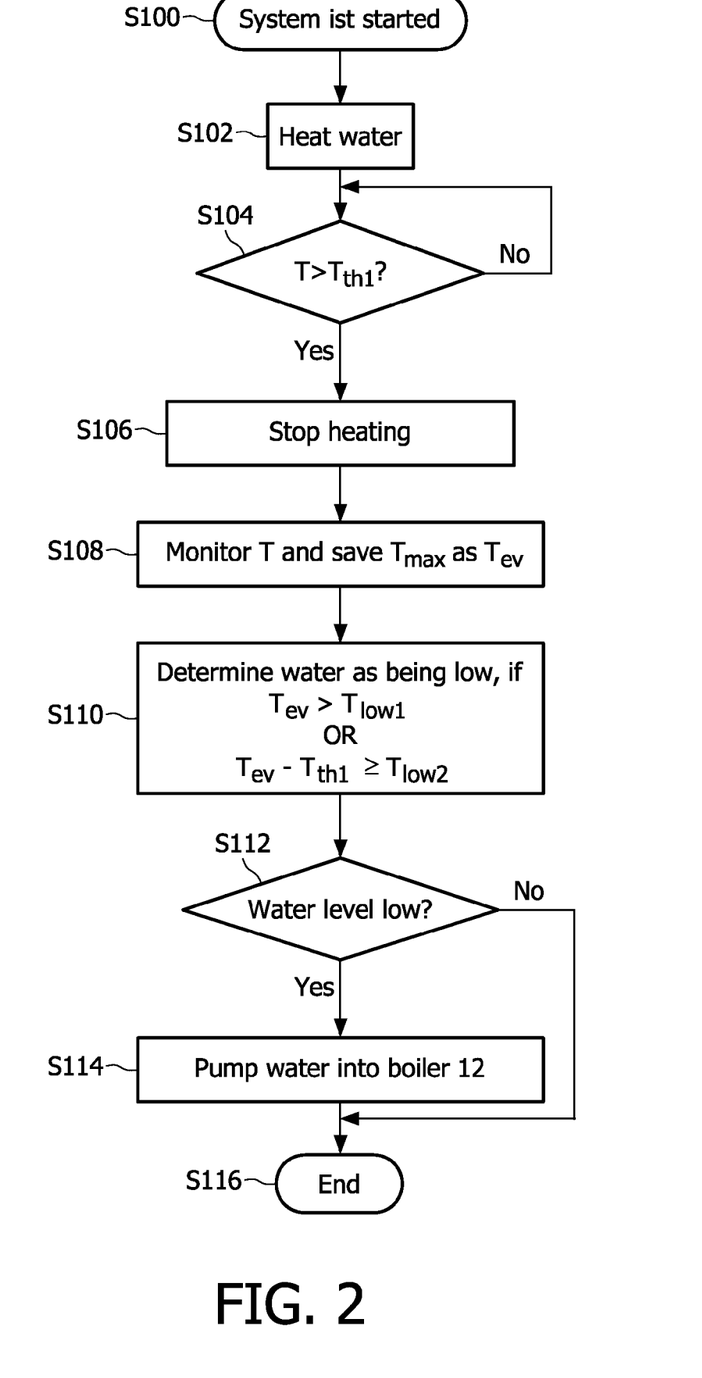
FIG. 2 shows a flow diagram of an initial water level sensing.

FIG. 2 shows a flow diagram of an initial water level sensing. This routine is executed by the electronic control unit 26 when the steam generating apparatus 10 is started. In step S100, the routine starts when the steam generating device 10 is powered on. In the next step S102, the water within the boiler 12 is heated by turning on the heating device 14. Due to turning on the heating device 14 in step S102, the temperature of the water within the boiler 12 and thus the temperature T sensed by the temperature sensor 24 increases, i.e. the temperature course is deflected upwards. In step S104, the routine holds until the temperature T sensed by the temperature sensor 24 reaches or exceeds a first threshold temperature $T_{th1}$ (FIG. 2 only shows a ">" sign but a "≥" sign has the same effect—this is applicable for the entire disclosure herein where a ">" or a "≥" sign is used). In order to check whether the first threshold temperature $T_{th1}$ is reached, the temperature is monitored accordingly. In this regard, monitoring means that the temperature T is sensed continuously and it is checked if the individual sensed temperature values fulfill the respective condition. As soon as this first threshold temperature $T_{th1}$ is reached or exceeded, the routine proceeds to step S106, where the heating device 14 is turned off. Turning off the heating device causes the temperature T to rise further up to a maximum temperature $T_{max}$, because of the heat accumulated in the heating plate 15. After reaching the maximum, the temperature falls again making the just mentioned temperature deflection to a temporary deflection. In step S108, the temperature T sensed by the temperature sensor 24 is again monitored as soon as the first threshold temperature $T_{th1}$ is reached. As soon as the temperature decreases, the highest temperature $T_{max}$, i.e. the maximum value, is stored in a memory of the electronic control unit 26 as an evaluation temperature $T_{ev}$. In step S110, the water level is considered as being low, if the evaluation temperature $T_{ev}$ is equal to or greater than a first low level threshold $T_{low1}$, wherein the first low level threshold $T_{low1}$ is a value of X degrees. Alternatively, in step S110, the water level can also be considered as being low, if the evaluation temperature $T_{ev}$ minus the first threshold temperature $T_{th1}$ is equal to or greater than a second low level threshold $T_{low2}$ which is a Δ-value of X degrees. For the case that the water level is determined as being low, step S112 directs the routine to step S114 where a predetermined amount of water is pumped into the boiler 12 by operating the water pump 38 for a predetermined fixed time period of X seconds. Otherwise, the routine is by-passed step S114. In any case, the routine reaches step S116 where the initial water level sensing routine ends. Summarizing the above routine, during the start-up of the steam generating device 10, the power of the heating device 14 is turned on such that the water temperature and temperature T sensed by the temperature sensor 24 rises to a certain value. Then the power of the heating device 14 is turned off. After turning off the power of the heating device 14, there is always a temperature overshot, the magnitude of which depends on the water level in the boiler 12. The higher the water level, the lower the temperature overshot. Based on the overshot magnitude, the initial water level can be sensed in order to start pumping water into the boiler 12, if the water level is determined as being low.

Figure 3:
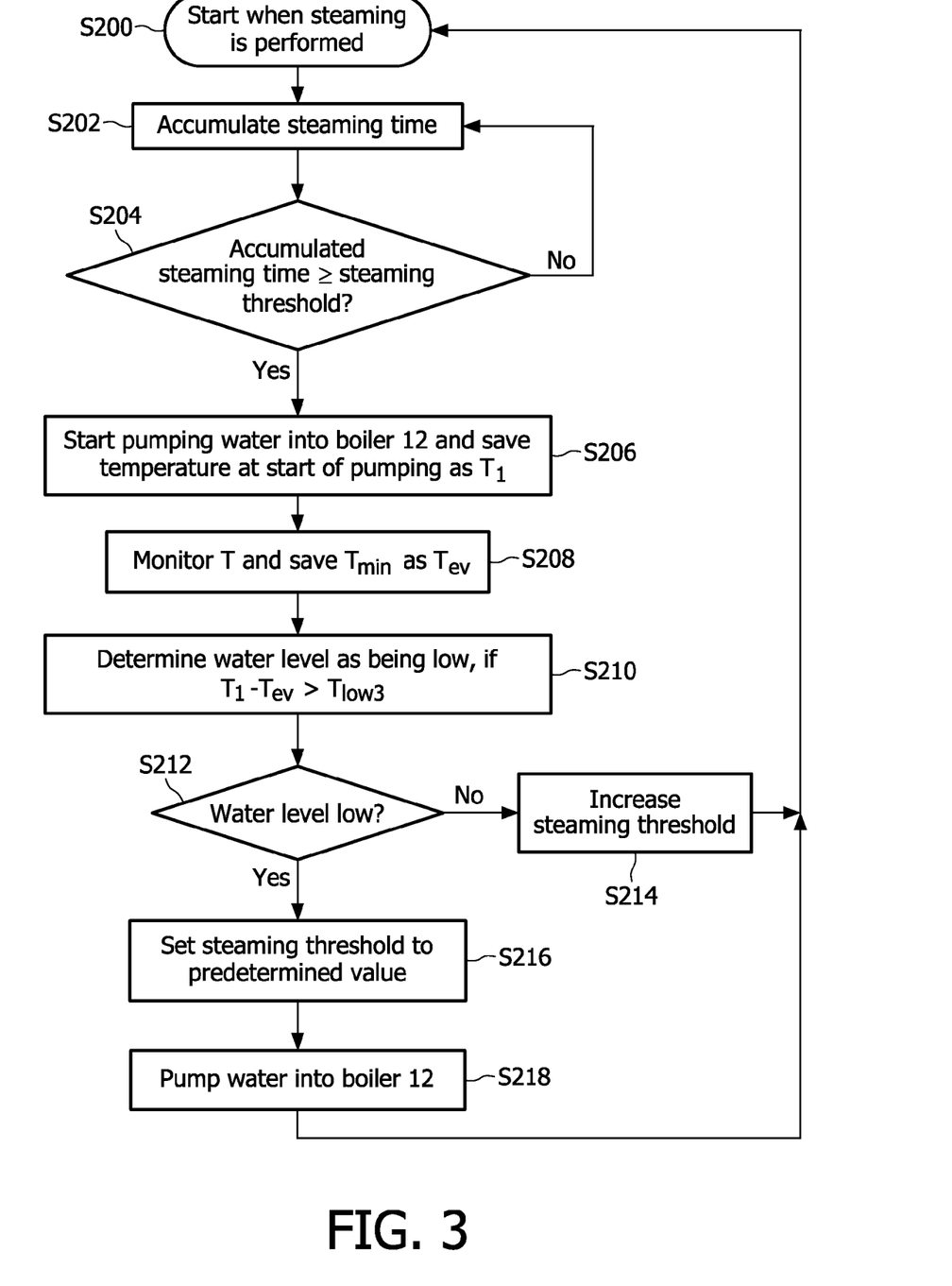
FIG. 3 shows a flow diagram of water level sensing during steaming.

FIG. 3 shows a flow diagram of a water level sensing during steaming. This routine is executed repeatedly during the operation of the steam generating apparatus 10. During the normal ironing process, a predetermined fixed amount of water will be pumped into the boiler 12 after steaming for a certain accumulated time. This refilling operation has to be executed anyway in order to ensure that water is refilled into the boiler 12 after steam was extracted for a certain accumulated time period. The refilling of water will cause a negative temporary temperature deflection which is in this case a temperature undershot at the temperature sensor 24, because the relatively cold water is directed to a spot in the vicinity of the temperature sensor 24. Within short the already present hot water in the boiler 12 mixes with the refilled cold water such that the temperature T rises again. The undershot magnitude, i.e. the minimum temperature after each pumping, is dependent on the water level within the boiler 12. The higher the water level inside, the less the undershot. This water level sensing during steaming is now described referring to FIG. 3 in more detail. The water level sensing routine is started when steaming is performed by pushing the steam trigger 48. In step S202 the time period for which the steam trigger 48 is pressed down is accumulated in the memory of the electronic control unit 26. Step S204 ensures that the routine only proceeds to step S206 after the accumulated steaming time is greater than or equal to a steaming threshold which is a value of X seconds. In step S206, the water pump 38 is operated for a predetermined fixed time period of X seconds. The predetermined time period can be chosen based on the flow rate of the pump, in order to pump a fixed volume of water from the water tank 40 into the boiler 12. Also in step S206, the temperature T sensed by the temperature sensor 24 is saved directly before or simultaneously with starting pumping. This temperature at the start of the pumping is saved as a comparison temperature $T_1$ in the memory of the electronic control unit 26. The pumping time can also be adjusted depending on different temperatures and pressures, and the triggering time of the steam trigger 48 in order to ensure that each time the same amount of water will be pumped into the boiler 12. After pumping the water into the boiler 12, in step S208, the temperature of the temperature sensor 24 is monitored while it drops until it starts to rise again. In this regard monitoring means that the temperature is sensed continuously and it is checked if the individual sensed temperature values fulfill the respective condition, i.e. reached a minimum value. Then, the lowest temperature $T_{min}$, i.e. the minimum value, is saved as the evaluation temperature $T_{ev}$ in the memory of the electronic control unit 26. Due to waiting until the minimum value is reached, the temperature sensor 24 can cool down completely, in order to sense the water level more accurately. Thereafter, in step S210, the water level is determined as being low, if the comparison temperature $T_1$ minus the evaluation temperature $T_{ev}$ is equal to or greater than a third low level threshold $T_{low3}$, wherein the third low level threshold is a Δ-value of X degrees. In step S212, the routine is directed to step S216, if the water level is determined as being low, and the routine is directed to step S214, if the water level is determined as being high. In step S214, the steaming threshold is increased, in order to enlarge the interval from one pumping to the next pumping of the water pump 38. In step S216, the steaming threshold is set to a predetermined value, thus defining the interval from one pumping to the next pumping of water into the boiler 12. After step S216, the routine proceeds to step S218 where a predetermined amount of water is pumped into the boiler 12 by operating the water pump 38 for a predetermined time period. After step S214 and step S218, the routine returns to step S200 where the routine is restarted. Two actions will cause the temperature to rise or to drop during the normal operation, namely these are steaming and pumping water into the boiler 12. The temperature drop during water being pumped into the boiler 12 is larger than the temperature drop due to steaming when the volume of water pumped in is large enough. Alternatively to the above description, the water level can be checked in step S210 based on $T_{ev}$ only. In this alternative, the water level is determined as being low, if the evaluation temperature $T_{ev}$ is below or equal to a fourth low level threshold $T_{low4}$.

Similar to the boiler water detection, the following two routines can be used to determine if water is coming from the water tank 40 into the boiler 12.

Figure 4:
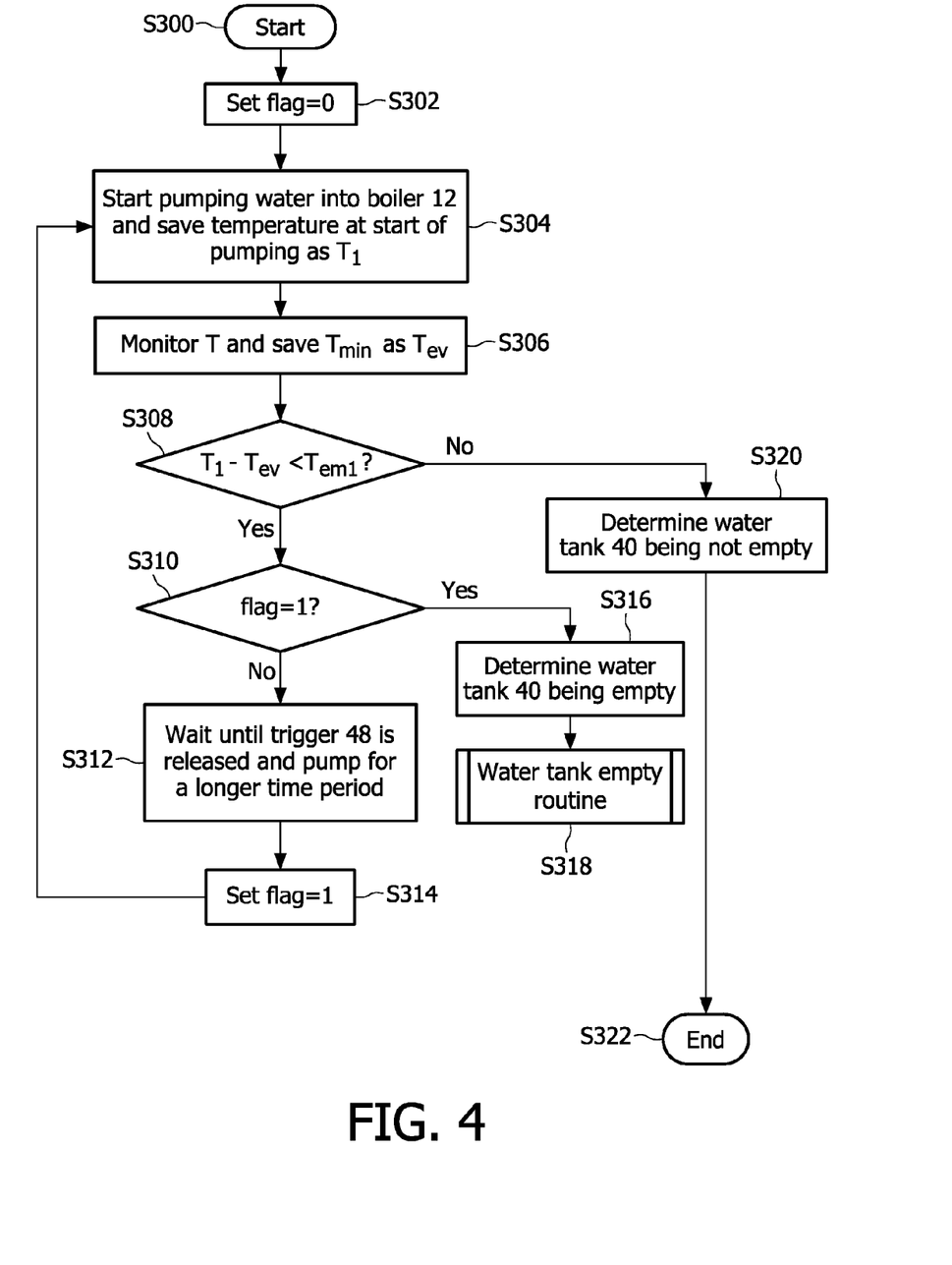
FIG. 4 shows a flow diagram of a water tank empty detection.
Figure 6:
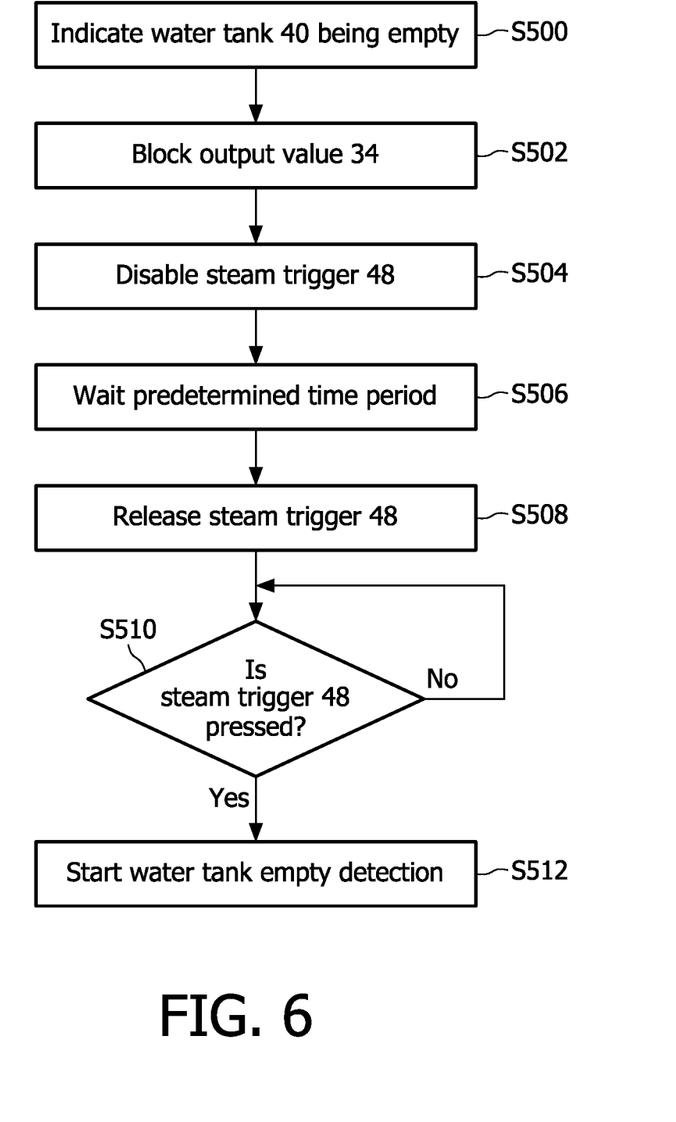
FIG. 6 shows a flow diagram of a water tank empty routine.

FIG. 4 shows a flow diagram of a water tank empty detection. This routine is executed by the electronic control unit 26 in certain intervals or after the routine of FIG. 3 determined several times that the water level is low. This routine is started in step S300 and right thereafter a flag is set to 0 in step S302. The steps S304 and S306 are identical to the previously described steps S206 and S208, respectively, such that their description is not repeated. Thereafter, when the routine reaches step S308, it is determined, if the comparison temperature $T_1$ minus the evaluation temperature $T_{ev}$ is smaller than a first tank empty threshold $T_{em1}$ which is a Δ-value of X degrees (FIG. 4 only shows a "<" sign but a "≤" sign has the same effect—this is applicable for the entire disclosure herein where a "<" or a "≤" sign is used). If it is determined in step S308 that this is not the case, the routine proceeds to step S320 where it is determined that the water tank is not empty and the routine ends at step S322. If in step S308 it is determined that the difference between the comparison temperature $T_1$ and the evaluation temperature $T_{ev}$ is smaller than the first tank empty threshold $T_{em1}$, the routine proceeds to step S310 where it is determined, if the flag is set to 1. If this is not the case, in step S312 one longer pumping will be done when the steam trigger 48 is released and the steaming stops. After this pumping, the flag is set to 1 in step S314 and the routine returns to step S304. If in step S310 the flag is set to 1, the water tank is determined being empty in step S316 and a water tank empty routine is started in step S318, which is shown in FIG. 6. Summarizing the above, the difference between the comparison temperature $T_1$ and the evaluation temperature $T_{ev}$ is compared with the first tank empty threshold $T_{em1}$, and if the difference does not drop below this first tank empty threshold $T_{em1}$, one longer pumping will be done when the steam trigger 48 is released and steaming stops. If the difference does not drop below the first tank empty threshold $T_{em1}$ again, the water tank is determined as being empty.

Figure 5:
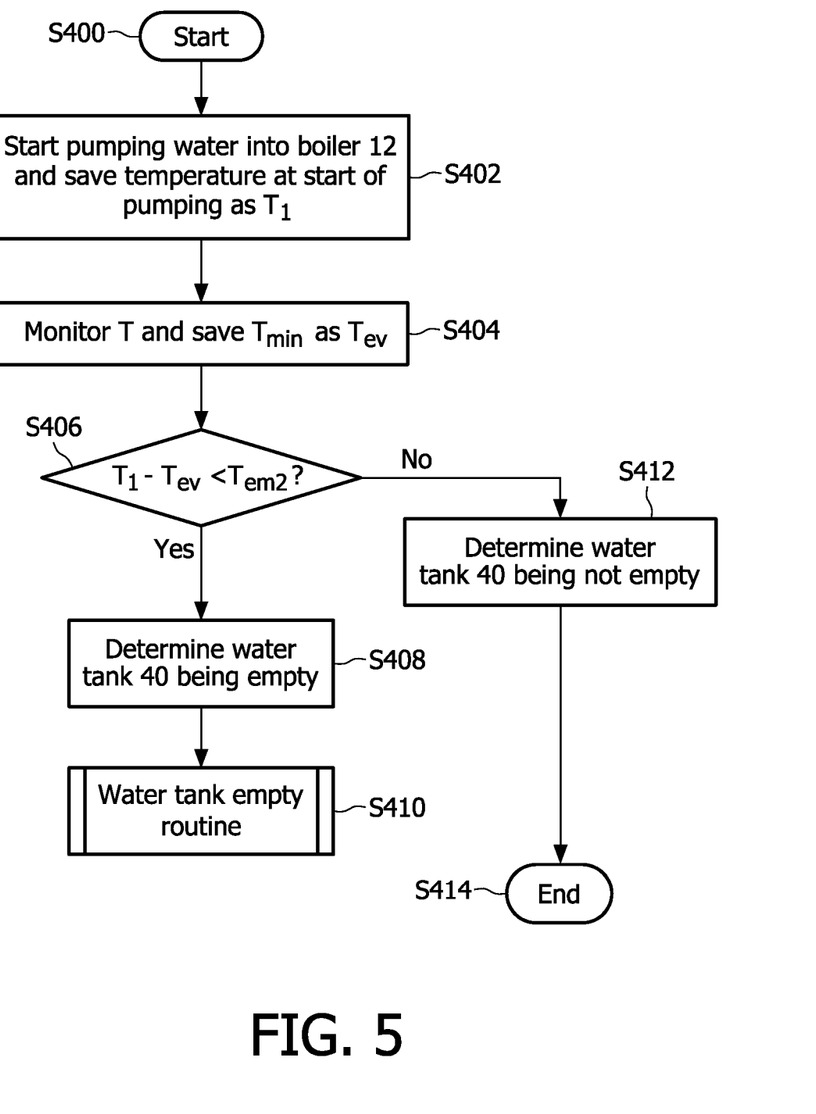
FIG. 5 shows a flow diagram of another water tank empty detection.

FIG. 5 shows a flow diagram of another water tank empty detection. This routine can be executed by the electronic control unit 26 alternatively to the routine shown in FIG. 4. The routine is started with step S400. The two steps thereafter, namely steps S402 and S404 are identical to the above described steps S206 and S208, respectively. Thereafter, in step S406 it is determined if the comparison temperature $T_1$ minus the evaluation temperature $T_{ev}$ is smaller than a second tank empty threshold $T_{em2}$ wherein the second tank empty threshold $T_{em2}$ is Δ-value of X degrees. If this is not the case, it is determined in step S412 that the water tank 40 is not empty and the routine ends at step S414. If step S406 is positive, the water tank 40 is determined as being empty in step S408. Step S408 is followed by step S410, where the water tank empty routine of FIG. 6 is executed. In the just described routine of FIG. 5, the second tank empty threshold $T_{em2}$ is predetermined based mainly on the volume of water filled into the boiler 12 each time the water pump 38 is operated. Therefore the second tank empty threshold $T_{em2}$ can be adjusted based on the volume of a water, if the volume changes.

FIG. 6 shows a flow diagram of a water tank empty routine. In the water tank empty routine the following steps will be executed. First, in step S500, it is indicated to consumers that the water tank 40 is empty by turning on a water tank empty light. In the following step S502, the output valve 34 is blocked to stop steaming which leads to another indication to consumers that the water tank 40 is empty. Thereafter, in steps S504 and S506, the steam trigger 48 is disabled for a certain time period of X seconds. This avoids a dry pumping of the water pump 38 when the water tank 40 is empty and therefore protects the water pump 38 from any damage. After the waiting period of step S506, in step S508 the steam trigger 48 is released such that the consumer is allowed to press the steam trigger 48 to restart the system. When the steam trigger 48 is pressed, step S510 directs the routine to step S512 where the routine is directed such that the water tank empty detection routine shown in FIG. 4 or FIG. 5 will be started again, in which water will be pumped from the water tank 40 to the boiler 12 first.

Equivalents and modifications not described above may also be employed without departing from the scope of the invention, which is defined in the accompanying claims.

The invention claimed is:

1. A method of determining a level of a liquid in a boiler of an apparatus having a temperature sensor for sensing a temperature (T) which is indicative of a temperature of the liquid inside the boiler, comprising the acts of:
    inducing a temporary deflection of the temperature (T) sensed by the temperature sensor;
    determining an evaluation temperature ($T_{ev}$) sensed by the temperature sensor directly after inducing the deflection, wherein the evaluation temperature ($T_{ev}$) is one of a maximum temperature ($T_{max}$) of the liquid inside the boiler after turning off a heating device including a temperature overshoot and a temperature decrease after reaching the maximum temperature ($T_{max}$) depending on the level of the liquid inside the boiler and a minimum temperature ($T_{min}$) of the liquid inside the boiler after filling the boiler including a temperature undershoot and a temperature increase after reaching the minimum temperature ($T_{min}$) depending on the level of the liquid inside the boiler; and
    determining the level of the liquid inside the boiler from at least the evaluation temperature ($T_{ev}$),
    wherein the inducing act includes an act of turning on the heating device for heating the liquid to induce the temporary deflection of the temperature (T), wherein the temporary deflection is an increase in the temperature T),
    wherein the act of determining an evaluation temperature ($T_{ev}$) includes the acts of:
        monitoring the increase in the temperature (T) by the temperature sensor;
        turning off the heating device when the temperature is greater that a first threshold temperature ($T_{th1}$); and
        saving the maximum temperature ($T_{max}$) of the liquid inside the boiler as the evaluation temperature ($T_{ev}$) when the temperature (T) decreases after the act of turning off the heating device, and
    wherein the act of determining the level of the liquid includes one of the acts of:
        determining the level of the liquid to be low when the evaluation temperature ($T_{ev}$) is greater than a first low level threshold ($T_{low1}$); and
        determining the level of the liquid to be low when a difference between the evaluation temperature ($T_{ev}$) and the first threshold temperature ($T_{th1}$) is greater than or equal to a second low level threshold ($T_{low2}$), and
    wherein the method further comprises the act of pumping water into the boiler when the act of determining the level of the liquid indicates that the level of the liquid inside the boiler is low.

2. The method as claimed in claim 1, wherein the heating device stays turned on until the temperature is greater than or equal to a first threshold temperature ($T_{th1}$).

3. The method as claimed in claim 1, wherein the temporary deflection of the temperature (T) is induced by filling liquid into the boiler.

4. The method as claimed in claim 3, wherein the liquid level is determined based on a difference between a comparison temperature ($T_1$) and the evaluation temperature ($T_{ev}$), wherein the comparison temperature ($T_1$) is sensed when filling liquid into the boiler is started.

5. The method as claimed in claim 4, wherein the comparison temperature ($T_1$) is sensed after an accumulated time of extracting steam from the boiler is greater than or equal to a steaming threshold.

6. The method as claimed in claim 5, wherein the steaming threshold is varied depending on the liquid level as determined before.

7. The method as claimed in claim 1, further comprising the act of concluding that a liquid tank from which a pump supplies the boiler with the liquid is empty when the level of the liquid within the boiler does not rise despite of operating the pump.

8. The method of claim 1, wherein the temperature sensor is in contact with a heating plate of the heating device.

9. The method of claim 1, wherein the boiler comprises a base and sidewalls extending from the base to a top of the boiler opposite the base, and wherein the temperature sensor is located at base of the boiler opposite a water inlet located at the top of the boiler.

10. The method of claim 1, wherein the inducing act further includes an act of filling liquid into the boiler and simultaneously saving a temperature at start of the filling act as a comparison temperature ($T_1$),
    wherein the act of determining an evaluation temperature ($T_{ev}$) further includes the acts of:
        monitoring a decrease in the temperature (T) by the temperature sensor; and
        saving the minimum temperature ($T_{min}$) of the liquid inside the boiler as the evaluation temperature ($T_{ev}$) when the temperature (T) decreases after the filling act,
    wherein the act of determining the level of the liquid further includes one of the act of:
        comparing a difference between the comparison temperature ($T_1$) and the evaluation temperature ($T_{ev}$) with a third low level threshold ($T_{low3}$); and
        determining the level of the liquid to be low when the difference is greater than the third low level threshold ($T_{low3}$).

11. The method of claim 10, further comprising, before the inducing act, the acts of:
    outputting steam from the boiler;
    accumulating a steaming time of output of the steam;
    performing the inducing act when the steaming time is greater than or equal to a steaming threshold; and
    increasing the steaming threshold when the act of determining the level of the liquid inside the boiler indicates that the level of the liquid is high so that a time interval until a next fixed volume of liquid is refilled is enlarged.

12. The method of claim 1, wherein the act of determining the level of the liquid inside the boiler includes comparing an expected temperature drop, due to filling the boiler with a predetermined amount of the liquid, with an actual temperature drop.

* * * * *